United States Patent [19]

Wegner et al.

[11] Patent Number: 5,087,649

[45] Date of Patent: Feb. 11, 1992

[54] PROCESS FOR THE PRODUCTION OF A DRY PRODUCT SUITABLE AS A PASTE BASE

[75] Inventors: Juergen Wegner; Wolfgang Dierichs, both of Duesseldorf; Werner Haller, Erkrath, all of Fed. Rep. of Germany; Johannes J. Jansen, Veendam, Netherlands; Anthony Capelle; Willem Kamminga, both of Zuidroek, Netherlands; Jacobus Guns, Hoogezand, Netherlands

[73] Assignees: Henkel Kommanditgesellschaft auf Aktien; Cooperatieve Verkoop-en Productievereniging van Aardappelmeel en Derivaten "AVEBE" B.A., Duesseldorf-Holthausen, Fed. Rep. of Germany

[21] Appl. No.: 625,771

[22] Filed: Dec. 7, 1990

Related U.S. Application Data

[63] Continuation of Ser. No. 254,508, Oct. 6, 1988, abandoned.

[30] Foreign Application Priority Data

Oct. 12, 1987 [DE] Fed. Rep. of Germany ....... 3734491

[51] Int. Cl.$^5$ .................. C08L 5/04; C08L 1/26; C08L 3/04
[52] U.S. Cl. ....................... 524/30; 524/42; 524/47; 524/50
[58] Field of Search .................. 524/42, 47, 50

[56] References Cited

U.S. PATENT DOCUMENTS

| | | | |
|---|---|---|---|
| 4,506,684 | 3/1985 | Keritsis | 131/369 |
| 4,704,416 | 11/1987 | Eck et al. | 524/50 |
| 4,716,186 | 12/1987 | Portnoy et al. | 524/50 |

FOREIGN PATENT DOCUMENTS 0103772 3/1984 European Pat. Off.

Primary Examiner—Maurice J. Welsh
Assistant Examiner—P. Hampton-Hightower
Attorney, Agent, or Firm—Ernest G. Szoke; Wayne C. Jaeschke; Real J. Grandmaison

[57] ABSTRACT

Dry products in flake or granulate form suitable as a paste base may be obtained by drying a mixture, containing approximately 30 to 80% by weight of water, of from (a) 30 to 95% by weight of carboxymethylated and/or alkoxylated starch,
(b) 3 to 40% by weight of a cellulose ether, and
(c) 2 to 40% by weight of a water-dispersible polymer or water-soluble polymer, and
(d) optionally, conventional additives, such as preservatives, wetting agents, fillers and the like, in a thin layer on a surface heated to 80° to 200° C. The dry products obtained do not undergo physical separation and are readily dispersible or self-dispersible in water.

9 Claims, No Drawings

PROCESS FOR THE PRODUCTION OF A DRY PRODUCT SUITABLE AS A PASTE BASE

This application is a continuation application of Ser. No. 07/254,508 filed on Oct. 6, 1988 now abandoned.

BACKGROUND OF THE INVENTION

1. Field of the Invention:

This invention relates to a process for the production of a dry product in flake or granulate form suitable as a paste base.

2. Discussion of Related Art:

Cellulose ether derivatives, for example methyl cellulose, methylhydroxypropyl cellulose (MHPC), methylhydroxyethyl cellulose (MHEC), either individually or in combination with carboxymethyl celluloses and standard starch derivatives (gelatinized starches, carboxymethyl starches, HPS, HPCMS and the like), are used with redispersible PVAC powder as wallpaper pastes in the prior art. These powder-form wallpaper pastes are stirred into water, the powder having to be added to the water with stirring to avoid the formation of lumps. With wallpaper pastes such as these based on mixtures of the above-mentioned hydrocolloids, entire portion units have to be used in order safely to counteract the tendency which products of this type typically show towards separation of the individual components. The wallpaper pastes mentioned above have the additional disadvantage of unwanted dust emission, particularly when the particle size of the individual components used is kept small in the interests of a higher swelling rate. Wallpaper pastes of the type mentioned above are known, for example, from European Patent Application 0 103 772.

DESCRIPTION OF THE INVENTION

Other than in the operating examples, or where otherwise indicated, all numbers expressing quantities of ingredients or reaction conditions used herein are to be understood as modified in all instances by the term "about".

The present invention is directed to a process for the production of a dry product suitable as a paste base which does not have any of the above-mentioned applicational disadvantages in regard to clumping, dust emission and separation but which, at the same time, is ready for application in a very short time, as required by many users, independently of the process of stirring into water.

According to the invention, this object is achieved by a process wherein a mixture, containing approximately 30 to 80% by weight of water, of from (a) 30 to 95% by weight of carboxymethylated and/or alkoxylated starch, (b) 3 to 40% by weight of a cellulose ether, and (c) 2 to 40% by weight of a water-dispersible polymer or water-soluble polymer, to which conventional additives, such as preservatives, wetting agents, fillers and the like, have optionally been added, is dried in a thin layer on a surface by heating to 80° to 200° C.

The carboxymethylated or alkoxylated starch used may be selected from any correspondingly modified, natural starch of potatoes, corn, wheat, rice, milo, tapioca and the like, a derivative based on potato starch or corn starch being preferred.

Cellulose ethers suitable for use in the process according to the invention include, in particular, the types known by the abbreviated names CMC, CMMC, EC, HBC, HBMC, HEC, HECMC, HEEC, HPC, HPCMC, HPMC, HEMC, MHEC, MC and PC, carboxymethyl cellulose (CMC) in the form of its alkali metal salt, methyl cellulose (MC), above all ethoxylated methyl cellulose (MC), and methylhydroxypropyl cellulose (HPMC) being preferred.

Suitable water-dispersible polymers or water-soluble polymers include any of the polymers normally used in paper sizes, with polymers selected from the group consisting of polyvinyl acetate, polyacrylate and ethylene-vinyl acetate copolymers, and water-soluble polymers selected from the group consisting of polyvinyl alcohol, polyvinylpyrrolidone and polyvinylmethyl ether being preferred.

In one preferred embodiment of the process according to the invention, the above-mentioned water-containing mixture is dried for about 2 to 60 seconds, and preferably for 5 to 25 seconds, at a temperature in the range from 100° to 160° C. The drying process, which preferably takes place in a thin layer is not critical, but is preferably carried out on rollers or a belt dryer, the drying energy being supplied in the form of steam, infra-red heat or microwaves.

Another advantageous embodiment of the invention is characterized by the use of a carboxymethylated or alkoxylated starch optionally treated with a crosslinking agent. Suitable crosslinking agents include the at least difunctional compounds known from the prior art, for example from U.S. Pat. No. 3,014,901, and also sodium trimetaphosphate, phosphorus oxychloride, diglycidyl ether and the like. Starches having a degree of carboxymethylation of 0.1 to 2.0 (DS) or a degree of alkoxylation of 0.05 to 1.5 (MS) are preferably used.

The starch derivatives to be used in accordance with the invention may thus be crosslinked and, in particular, weakly crosslinked. According to R. L. Whistler and E. F. Paschall (Ed.), Starch: Chemistry and Technology, Vol. II, page 317 (1967), Academic Press, New York, weakly crosslinked carboxymethyl starches can be gelatinized in hot water.

In another advantageous embodiment of the invention, optionally crosslinked starch may be reacted with chloroacetic acid or an alkali metal salt thereof in known manner to form a carboxymethylated starch having a DS of 0.1 to 2.0, the polymer dispersion and cellulose ether added to the reaction product obtained and the resulting mixture dried in a thin layer by heating on a surface, more especially on rollers or an endless belt.

The present invention also relates to a wallpaper paste containing from (a) 30 to 95% by weight of carboxymethylated and/or alkoxylated, optionally crosslinked, more especially weakly crosslinked, starch, (b) 3 to 40% by weight of a cellulose ether, and (c) 2 to 40% by weight of a water-dispersible polymer or water-soluble polymer, and (d) optionally conventional additives, such as preservatives, wetting agents, fillers and the like.

According to the invention, preference is attributed to dry products which, after production, are ground and sifted, a screen fraction having the following particle size distribution being collected:

<0.4 mm, max. 3% by weight,
>0.4 mm and <1.0 mm, max. 27% by weight,

>1.0 mm and <1.6 mm, max. 35% by weight, and
>1.6 mm and <3.0 mm, max. 35% by weight.

In addition to the advantages earlier mentioned, dry products of the type mentioned above have the property of being readily dispersible or self-dispersible.

Self-dispersible dry products obtained in accordance with the invention may be visually recognized not only by the preferred particle size distribution mentioned above, but also by their sponge-like structure visible with an electron microscope adjusted to a magnification of 50 to 250:1. One side of a particle shows a natural sponge-like structure while the other side is substantially smooth.

The present invention also relates to the use of a dry product of the type mentioned above as a self-dispersible or readily dispersible wallpaper paste.

The invention is illustrated by the following examples.

EXAMPLE 1

This example describes the preparation of a crosslinked carboxymethylated starch, a wallpaper paste, and the use thereof.

18 kg of potato starch (19% $H_2O$) was suspended in 25 kg of water and the resulting suspension adjusted with sodium hydroxide to a pH value of 11. 4.5 g of epichlorohydrin were then run into the suspension with stirring and, after 16 hours at 30° C., 3.3 kg of the sodium salt of monochloroacetic acid were introduced into the starch suspension. The suspension was mixed with 2.5 kg of 50% sodium hydroxide solution by means of a metering pump in such a way that proportional parts by volume of suspension and sodium hydroxide were always present. The reaction mixture was pumped through a steam-heated static mixer for a residence time in the heating zone of 30 seconds. The product exit temperature was 95° C.

Production of a wallpaper paste:

9.69 kg of a commercial, homopolymeric polyvinyl acetate dispersion and 6.65 kg of a commercial, ethoxylated methyl cellulose were stirred into the highly viscous, hot reaction mixture obtained as described above.

The polyvinyl acetate dispersion was an unplasticized product containing polyvinyl alcohol as emulsifier or protective colloid and having the following properties:
solids content (DIN 53 189) approx. 50% by weight,
particle diameter 50–5000 nm,
viscosity at 23° C. (Brookfield RVT viscosimeter, 20 r.p.m. (ISO 2555)) 18,000 to 28,000 mPa.s,
pH value (DIN 53 785) 3–4,
acid value (DIN 53 402) <3 mg KOH/g,
minimum film-forming temperature (MFT; DIN 53 787) approx. 15° C.

The commercial methyl cellulose was a powder-form product having a Brookfield viscosity (2% aqueous solution) of 12,000 mPa.s The reaction mixture obtained was spread in a thin layer over a heated rotating roller and, at the same time, dried (roller temperature 120° C., residence time 15 seconds). The stripped dry product was then ground to the desired fine particle size. The resulting product typically showed the following, approximate particle size distribution (which also applies to the remaining examples):
<2.0 mm approx. 15%,
<1.25 mm approx. 45%,
<0.8 mm approx. 25%,
<0.4 mm approx. 12%,
>0.4 mm max 3%

The weight per liter of these end products was typically between 200 and 350 g/l.

The product obtained was then performance-tested with a view to its proposed use as a wallpaper paste. The test results are shown in Table 1. A product of the same composition which had not been roller-dried was similarly tested for comparison purposes. The following composition was selected for the comparison test: 65% of a commercial crosslinked, rapidly hydrolyzing carboxymethyl potato starch, 15% of a commercial PVAc redispersion powder having a specification corresponding to the above dispersion, 20% of a commercial methyl cellulose, finely divided and retarded in its solubility by treatment with glyoxal and having a Brookfield viscosity (2% solution) of 12,000 mPa.s.

Compared with the non-roller-dried product mixture of the same composition, the product according to the invention shows no tendency towards separation in the shaking test, is selfdispersing on addition of water, has substantially the same solution viscosities as the comparison standard, but surprisingly shows much higher dry adhesive strength and wet strength.

EXAMPLE 2

Preparation of a crosslinked carboxymethylated starch 25 parts by weight of 40% sodium hydroxide were thoroughly mixed with 1000 parts by weight of corn starch. 1.5 parts by weight of epichlorohydrin were then added and the mixture heated for 1 hour to around 60° C. in a closed vessel. The reaction product obtained was then suspended in 1200 parts by weight of water, followed by the successive addition of 290 parts by weight of sodium monochloroacetate and 360 parts by weight of 9N sodium hydroxide, causing the starch to gelatinize. The temperature in the heating jacket of the reaction vessel was then increased to 70°–80° C. over a period of about 20 minutes. The reaction mixture was left to react for 90 minutes at that temperature. The hot reaction mixture obtained was used for the further reactions.

Production of a wallpaper paste 553 g of a commercial, approximately 50% dispersion of an acrylate copolymer and 369 g of a commercial methyl cellulose were stirred into the hot reaction mixture obtained as described above.

The acrylate copolymer used has the following properties:
dry residue 50%,
pH value 7.5 to 9,
average particle diameter 100 nm,
viscosity (Epprecht STV viscosimeter, measuring element C,
stage III) 500 to 1500 mPa.s,
density of the dispersion approx. 1.04 g/cm$^3$
density of the polymer approx. 1.08 g/cm$^3$, and
MFT (0.25 mm wet film) approx. 22° C.

The methyl cellulose used was a powder-form methyl cellulose having a Brookfield viscosity (2% aqueous solution) of 300 mPa.s.

The reaction mixture obtained was then spread over a drying roller in the same way as in Example 1 (roller temperature 130° C., residence time 10 seconds) and subjected to coarse size reduction before being performance-tested. The test results obtained are shown in Table 1.

A raw material mixture based on 65% of a commercial carboxymethyl starch in flake form, 20% of a commercial methyl cellulose and, in addition, 15% (based on solids) of the original dispersion was used in the prepared paste for comparison purposes. The comparison test showed that the product according to the invention showed no tendency towards separation, was readily redispersible, comparable in its viscosity with the comparison product, but 10% better than the comparison product in its dry adhesive strength and showed surprisingly a comparable high wet strength. It follows from this that roller drying clearly does not adversely affect the redispersibility of the polymer used.

EXAMPLE 3

A crosslinked carboxymethylated potato starch was first prepared in the same way as in Example 2. 539 g of a commercial 50% PVAc homopolymer dispersion having the same composition as in Example 1 and 90 g of a commercial finely divided methyl cellulose having the same composition as in Example 2 were then added without preliminary cooling to 5090 g of this intermediate product (dry matter content 35.3%) in the reaction vessel at a temperature of 90° C. The highly viscous mixture was then dried on a roller and subjected to coarse size reduction in the same way as described in Example 1. The results obtained are shown in Table 1.

A physical mixture consisting of 80% of a commercial flakeform carboxymethyl starch and 5% of a commercial methyl cellulose (retarded formulation; Brookfield viscosity of a 2% aqueous solution 3000 mPa.s) was used for comparison. In addition, polymer dispersion was added to the stirred paste in the mixing ratios indicated in such a quantity that the comparison product contained 15% PVAc based on the solids content of the dispersion.

The results again showed that the product according to the invention showed no tendency towards separation, had good selfdispersing properties and was either superior to or substantially comparable with the comparison product in regard to solution viscosity, dry adhesive power and wet strength, depending on the mixing ratio. The results in regard to wet strength again show that roller drying can be carried out with no loss of quality.

EXAMPLE 4

Production was carried out in exactly the same way as in Example 1 except for the crucial difference that a commercial, finely divided carboxymethyl cellulose was used instead of a commercial, finely divided methyl cellulose and was included in the roller drying process.

The carboxymethyl cellulose used had the following characteristic data:
Viscosity (2%): 6500 mPa.s (Brookfield RVT),
NaCl content 0.45%,
pH (solution) 6.7, and
apparent density 320 g/l.

All the other constituents of the formulation and the production conditions corresponded to those of Example 1. The results of the performance test are shown in Table 1. A non-roller-dried comparison product was prepared in the same way as the comparison product of Example 1, except that 20% of the carboxymethyl cellulose mentioned above were used.

The results showed that the product obtained showed no tendency to separate. Its wet strength was adequate for certain applications.

EXAMPLE 5

450 kg of potato starch (moisture content 20%) were suspended in 480 l of water in a closed reaction vessel. The suspension was heated to 50° C. 30 l of sodium hydroxide (normality 7.5N) were then stirred into the suspension. After stirring for 20 minutes, 0.77 l of epichlorhydrin and 180 l of propylene oxide were added to the suspension in two portions of 90 l over a period of 25 minutes. After a total reaction time of 50 minutes at a reaction temperature of 85° C., the reaction mixture was neutralized to a pH value of 6 to 6.5.

175 g of a 50% commercial homopolymeric polyvinyl acetate dispersion having the same composition as in Example 1 and 117 kg of a commercial powder-form methyl cellulose having a Brookfield viscosity of 12,000 mPa.s were then stirred into the reaction mixture.

Finally, the mixture was subjected to roller drying and coarse size reduction in the same way as described above. The results of the performance testing of this product are shown in Table 1.

The product according to the invention showed no separation, and the other properties were substantially identical with those of the physical mixture.

EXAMPLE 6

The procedure was exactly the same as in Example 1 using the test arrangement described in Example 2. The coarsely sizereduced roller dried product obtained produced the results shown in Table 1.

The performance properties of the product obtained were distinctly improved in relation to those of a physical mixture.

EXAMPLE 7

A crosslinked carboxymethylated starch was prepared in the same way as described in Example 2, 5090 g of the reaction mixture obtained (dry matter content 35.3%) being mixed with 200 g of a commercial homopolymeric PVAc dispersion having the same composition as in Example 1 and 100 g of a commercial methyl cellulose having the same composition as in Example 2. The product was subjected to roller drying and coarse size reduction in the same way as described in Example 1. The results of the performance testing of the product are shown in Table 1. The product shows no tendency towards separation. All its performance properties were substantially identical with those of a physical mixture. However, it was also found that the small addition of PVAc or MC to commercial CMS produced a significant increase in adhesive strength of around 50% in relation to the pure product.

EXAMPLE 8

A premix was prepared in the same way as in Example 1, except that a powder-form methylhydroxypropyl cellulose having a Brookfield viscosity of 20,000 mPa.s was used instead of the methyl cellulose. Further processing by roller drying and coarse size reduction were also carried out as described in Example 1. The performance test results are shown in Table 1.

Once again, the product showed no tendency towards separation and was self-dispersing. It was comparable in its viscosity values to a physical mixture and slightly superior in its dry adhesive strength.

EXAMPLE 9

The procedure was as in Example 8, except that a commercial powder-form methylhydroxyethyl cellulose having a Brookfield viscosity (2% aqueous solution) of 25,000 mPa.s was used instead of MHPC. The performance data are shown in Table 1.

The product showed no signs of separation.

EXAMPLE 10

The procedure was as in Example 2, except that 553 g of a commercial ethylene-vinyl acetate copolymer dispersion having the following properties was used in the polymer component:
solids content approx. 50%,
average particle diameter 500-2000 nm,
pH 4-5, and
MFT approx. 0° C.

Roller drying and working up were carried out as described in Example 2.

The performance data set out in Table 1 show that a wallpaper paste of relatively low dry adhesive strength was obtained, being suitable for certain applications. Compared with the physical mixture, the product showed no tendency to separate and was self-dispersing. The other performance data correspond to those of the physical mixture.

EXAMPLE 11

This product was prepared in the same way as the product of Example 1, except that 5% of a low-viscosity, highly hydrolyzed polyvinyl alcohol having the following properties was added to the hot premix:
viscosity (4%, DIN 53015): 4±1 mPa.s,
degree of hydrolysis 98.4%, and
pH 4.5-7.

In addition, 30% of a commercial methyl cellulose having the same composition as in Example 2 was added. The results of the performance tests are shown in Table 1.

The results show that the use of water-soluble polymers also produced a self-dispersing effect. In addition, the property spectrum of the product according to the invention was at a relatively high level, particularly in regard to the resulting dry adhesive strength and wet strength which showed a slight improvement over the physical mixture. Unlike the physical mixture, the product showed no tendency to separate.

EXAMPLE 12

1500 g of potato starch were suspended in 1800 g of water in a reaction vessel. The suspension was heated to 65° C. and 120 g of sodium hydroxide (20%) added. The mixture was then stirred for 15 minutes.

3 g of epichlorohydrin dissolved in 300 g water and 522 g of propylene oxide were then added. The addition time was 30 minutes.

The mixture was then stirred for 1 hour at 70° to 75° C. The reaction mixture obtained was then neutralized with 62.3 g of phosphoric acid (75%). 415 g of a commercial polyvinyl alcohol dissolved in 1245 g of at water 85° C. were added to the resulting mixture. The polyvinyl alcohol had the following properties:
viscosity (DIN 53015, 4%): 5.2-6.0 mPa.s,
degree of hydrolysis 98-99%, and
pH 5-7.

In addition, 454 g of a commercial methyl cellulose having the same composition as in Example 1 were stirred into the reaction mixture. The mixture was then dried in known manner on heated surfaces.

The product was self-dispersing and had a degree of substitution of 0.7.

The performance data of the products of Examples 1 to 11 according to the invention are shown in Table 1. The selfdispersion data were obtained by the following test method:

1. Mount a water container directly above a 1 liter glass beaker
2. Add 20 g product into the glass beaker.
3. Pour 800 ml tapwater of 20° C. into the container.
4. Open the faucet of the water container completely and allow the 800 ml water to flow onto the product; then depress stopwatch.
5. Measure the time which the product takes to fill the entire liquid volume (or to coalesce upwards or downwards or in both directions).

If coalescence lasts longer than 6 minutes, the measurement is terminated and declared as longer than 6 minutes.

The result is expressed in increments of 1 minute, for example, as follows:

| | |
|---|---|
| 2 to 3 mins | +++ |
| 3 to 4 mins | |
| 4 to 5 mins | ++ |
| 5 to 6 mins | + |
| >6 mins | − |

The 1-minute increments minimize the measurement error.

The water container used is a glass vessel (diameter 8.5 cm; height 15 cm) with a 2 cm wide outlet nozzle with faucet (MS 29.2)

The performance data of the products which are physical mixtures of the individual components not obtained in accordance with the invention, are shown in Table 2.

TABLE 1

| | Example no. | | | | | | | | | | |
|---|---|---|---|---|---|---|---|---|---|---|---|
| | 1 | 2 | 3 | 4 | 5 | 6 | 7 | 8 | 9 | 10 | 11 |
| Separation tendency | − | − | − | − | − | − | − | − | − | − | − |
| Self-dispersion | +++ | +++ | +++ | + | + | +++ | + | +++ | − | +++ | +++ |
| Viscosity (mPa.s) for a mixing ratio (MR) of | | | | | | | | | | | |
| 1:25 | 42,000 | 21,000 | 24,000 | 32,000 | 25,000 | 44,000 | 37,000 | 70,000 | 23,000 | 13,000 | 55,000 |
| 1:32 | 16,500 | 8,800 | 7,100 | 9,400 | | 18,000 | 14,400 | 21,000 | 9,000 | 6,200 | 27,000 |
| 1:40 | 5,600 | 3,000 | 2,100 | 3,800 | | 8,500 | 5,200 | 7,200 | 4,100 | 2,400 | 10,000 |
| Dry adhesive strength in N/cm² (MR 1:25) | 91 | 42 | 60 | 71 | 110 | 90 | 68 | 69 | 56 | 40 | 85 |

TABLE 2

| | Comparison Examples Physical Mixtures of Examples | | | | | | | | | | |
|---|---|---|---|---|---|---|---|---|---|---|---|
| Example no. | 1 | 2 | 3 | 4 | 5 | 6 | 7 | 8 | 9 | 10 | 11 |
| Separation tendency | + | + | + | + | + | + | + | + | + | + | + |
| Self-dispersion | − | − | − | − | − | − | − | − | − | − | − |
| Viscosity (mPa.s) for a mixing ratio (MR) of | | | | | | | | | | | |
| 1:25 | 42,000 | 19,000 | 17,500 | 26,000 | 25,000 | 42,000 | 23,000 | 65,000 | 80,000 | 12,000 | 50,000 |
| 1:32 | 20,000 | 8,600 | 9,600 | 9,100 | | 20,000 | 11,600 | 19,000 | 25,000 | 6,000 | 26,000 |
| 1:40 | 8,400 | 3,200 | 3,900 | 3,800 | | 8,400 | 5,800 | 6,000 | 10,000 | 2,200 | 9,400 |
| Dry adhesive strength in N/cm$^2$ (MR 1:25) | 69 | 38 | 61 | 68 | 110 | 69 | 65 | 60 | 61 | 39 | 75 |

Abbreviations used in the specification:
MHPC=methyl-hydroxypropyl cellulose, MHEC=methyl-hydroxyethyl cellulose, HPS=hydroxypropyl starch, HPCMS=hydroxypropyl-carboxymethyl starch, PVAC=polyvinyl acetat, CMC=carboxymethyl cellulose, CMMC=carboxymethyl-methyl cellulose, EC=ethyl cellulose, HBC=hydroxybutyl cellulose, HBMC=hydroxybutyl-methyl cellulose, HEC=hydroxyethyl cellulose, HECMC=hydroxyethyl-carboxymethyl cellulose, HEEC=hydroxyethyl-ethyl cellulose, HPC=hydroxypropyl cellulose, HPCMC=hydroxypropyl-carboxymethyl cellulose, HPMC=hydroxypropyl-methyl cellulose, HEMC=hydroxyethyl-methyl cellulose, MC=methyl cellulose, PC=propyl cellulose, CMS=carboxymethyl starch

We claim:

1. A process for the production of a dry product in flake or granulate form suitable as a paste base, consisting of preparing a mixture containing approximately 30 to 80% by weight of water, said mixture consisting essentially of from
   (a) about 30 to about 95% by weight of carboxymethylated or alkoxylated starch,
   (b) about 3 to about 40% by weight of a cellulose ether, and
   (c) about 2 to about 40% by weight of
   (c) about 2 to about 40% by weight of a water-dispersible polymer or water-soluble polymer selected from the group consisting of polyvinyl acetate, polyacrylate and ethylene-vinyl acetate, to which conventional additives, such as preservatives, wetting agents, fillers and the like may be added, drying said mixture in a thin layer on a roller surface by heating to 80° to 200° C., grinding and sifting the dried mixture, and collecting a screen fraction thereof having the following particle size distribution:
   <0.4 mm, maximum 3% by weight,
   >0.4 mm and <1.0 mm, maximum 27% by weight,
   >1.0 mm and <1.6 mm, maximum 35% by weight, and
   >1.6 mm and <3.0 mm, maximum 35% by weight,
   to provide a product which is self-dispersible without separation of its components in water.

2. A process as in claim 1 including drying said mixture over a period of about 2 to about 60 seconds and at a temperature of from about 100° to about 160° C.

3. A process as in claim 1 wherein said mixture is dried on rollers or on a belt dryer.

4. A process as in claim 1 including treating said carboxymethylated or alkoxylated starch with a crosslinking agent.

5. A process as in claim 1 wherein said starch has a degree of carboxymethylation of about 0.1 to about 2.0 or a degree of alkoxylation of about 0.05 to about 1.5.

6. A process as in claim 1 wherein an ethoxylated methyl cellulose, methylhydroxypropyl cellulose or carboxymethyl cellulose is used as said cellulose ether.

7. A process as in claim 1 wherein said water-soluble polymer is selected from the group consisting of polyvinyl alcohol, polyvinylpyrrolidone and polyvinyl methyl ether.

8. A process as in claim 1 wherein said starch comprises a crosslinked starch which has been reacted with chloroacetic acid or an alkali metal salt thereof to form a carboxymethylated starch having a degree of carboxymethylation of from about 0.1 to about 2.0, and said polymer and said cellulose ether are added to the reaction product.

9. A wallpaper paste prepared by the process of claim 1.

* * * * *